Jan. 29, 1963

D. SCARAMUCCI 3,075,547

SWING CHECK VALVE

Filed April 22, 1960

INVENTOR.
DOMER SCARAMUCCI

BY

*Jerry J. Dunlap*

ATTORNEY

Jan. 29, 1963 D. SCARAMUCCI 3,075,547
SWING CHECK VALVE
Filed April 22, 1960 3 Sheets-Sheet 2

INVENTOR.
DOMER SCARAMUCCI,
BY
ATTORNEY

Jan. 29, 1963 D. SCARAMUCCI 3,075,547
SWING CHECK VALVE
Filed April 22, 1960 3 Sheets-Sheet 3

INVENTOR.
DOMER SCARAMUCCI
BY
*Jerry J. Dunlap*
ATTORNEY 3,075,547
SWING CHECK VALVE
Domer Scaramucci, Box 9125, Oklahoma City 15, Okla.
Filed Apr. 22, 1960, Ser. No. 23,945
8 Claims. (Cl. 137—516.29)

This invention relates generally to improvements in valves, and more particularly, to improvements in valves of the type commonly known as swing check valves.

Check valves characterized by swinging or pivoted clappers or closure members are well known and widely employed in industry. Several features of this type of valve make its use particularly desirable in certain applications and under particular operating conditions. Thus, where there is need for a large through opening to permit substantially instantaneous passage of a large volume of liquid, the swing check valve is well adapted to meet such requirements since the closure member may easily be made to swing clear of the fluid passage, thus providing the desirable large through opening. This is not true of poppet and ball check valves generally where the ball or other sealing means is displaced along the line of fluid flow and remains a partial obstruction to free passage of the fluid.

Moreover, check valves of the pivoted closure member type do not generally require such accurate machining of the valve seat and closure member surfaces in the manufacturing process as do ball check valves or poppet valves. In valves of the latter type, it is necessary that the spherical or other valve closure member be accurately and exactly centered with respect to the valve seat in order to prevent leakage past the closure member. The sealing surfaces of the closure members of swing check valves, on the other hand, need not be exactly in circumferential registry with the abutting flat surfaces of the valve seat, and considerable tolerance in this respect is permissible provided that complete circumferential abutting contact with the flat surfaces of the seat is established by the cooperating flat sealing surface carried by the pivoted valve closure member.

Despite the meritorious features inherent in swing check valves which have led to their widespread usage in certain industrial applications, valves of this type are characterized by certain disadvantages under certain conditions of use which have led to their replacement by other valves of different construction. Many of these disadvantages may be attributed to seal failure or leakage during closure which results from the vertical misalignment of the valve closure member sealing surfaces with the valve seat. In other words, in order to provide an effective seal, the closure member and its associated flat sealing surfaces must be disposed in a plane substantially parallel to the flat surfaces of the seat as the sealing contact is made, otherwise a portion of the sealing surfaces will be in abutting relation while an opening will exist between the remaining portions.

Moreover, swing check valves having flat seating and sealing surfaces generally have their seats formed in the shape of annular flanges projecting into the valve body in the path of fluid flow and the abrupt abutment or drop-off thus formed permits the rapid accumulation of sediment or colloidal material adjacent the seat annulus with the result that fouling of the seat and leakage past the valve closure member tend to occur relatively early in the life of the valve. In applications involving fluids of high solids content, the gritty or abrasive nature of the entrained solids may further result in rapid scoring of the mating seating and sealing surfaces with consequent leakage development.

It is also well known that swing check valves characterized by the flat-surfaced, annular seat flanges produce greater turbulence in the fluid stream than do valves of the reciprocating or ball check type, for example, which are designed with frusto-conical or tapered seats and spherical or other curved surface valve closure members which seat and open by moving directly along the axis of fluid flow. Valves of the latter type are, in many applications, recognized as superior in sealing performance to the flat seat swing check valve, particularly under conditions where the fluid passed has a high sediment content of abrasive material and/or high line pressure is involved.

Conical or tapered seat design presents another advantage over the flat-surfaced seat prevalent in swing check valves. This advantage resides in the degree of cushioning of the closure member as it approaches and contacts the valve seat. In the case of flat-surfaced seats used in conjunction with a pivoted or swinging valve closure member, the tendency of the closure member or clapper to strike the seat with considerable impact and consequent wearing and damage of the cooperating seal-forming surfaces is considerably more pronounced than in the case of valves having tapered or frusto-conical seats.

A corollary of the degree of cushioning obtained as the closure member seats, is the effectiveness of the initial seal obtained or, stated differently, the amount of "chattering" or "banging" which obtains as the closure member contacts the seat. The tapered seats thus afford a smoother and more uniform seal establishment than valves having flat-surfaced seats.

Because of the need for a large through opening when highly viscous, sediment-containing fluids are pumped at low pressures, the use of swing check valves has predominated when such conditions of operation have been encountered. However, even in these circumstances favoring the use of swing check valves, the disadvantage occurs that such valves tend to leak at the very low pressure obtaining at the instant of closing. An effective seal is usually formed only when the pressure across the valve rises sufficiently to force the sealing surface tightly against the seat throughout its peripheral extent. Due to the "wedging" or precise centering control of the valve closure member which is characteristic of check valves having tapered or frusto-conical seats cooperating with mating or complementary sealing surfaces, a check valve which combined the large through opening feature of the swing check valve with the highly effective sealing characteristics of check valves having tapered or frusto-conical seats would be a particularly useful check valve adapted to use in a wide range of applications where a variety of valve types are now required.

The swing check valve of the present invention comprises a check valve having a pivoted valve closure member or clapper which is so mounted and retained in the valve body that the clapper and its associated sealing surfaces are pivoted through an arc to a position well out of the path of flow when the valve is opened, but which approach and contact the valve seat in a direction parallel to the path of fluid flow normal to the seat during the instant before actual contact of sealing and seating surfaces. It will be appreciated by those skilled in the art that this latter motion of the valve closure member or clapper relatively to the seat is the same as that which characterizes reciprocating, poppet or ball check valves, which, by virtue of this movement of the closure member along the flow axis, may be designed with tapered or frusto-conical seat surfaces. The present invention, therefore, further contemplates the employment in a swing check valve having a closure member capable of both pivotal and reciprocating movement, of a seat having a tapered or frusto-conical seating surface, and also a closure member which carries offset resilient and metallic tapered or frusto-conical sealing surfaces which are complementary to, and mate with, the tapered surface of the seat. The valve of the present invention is further characterized by a seat which has a flat seating surface contiguous to the above-mentioned tapered or frusto-conical seating surface, and by a protruding resilient lip carried by the closure member of the valve and adapted to be biased into flat abutting contact with said flat seating surface when the valve is closed. The arrangement of the frusto-conical and flat seating surfaces with respect to the metallic and resilient frusto-conical sealing surfaces and to the resilient lip is such that upon closure of the valve, contact is initially established between the resilient lip and the flat sealing surface. As the pressure closing the valve increases, sealing contact with the tapered or frusto-conical seating surface is made by the resilient frusto-conical sealing surface. Finally, as the closure pressure further builds up against the closure member, the resilient member bearing the frusto-conical sealing surface is compressed and the metallic frusto-conical sealing surface comes in contact with the tapered or frusto-conical seating surface. Simultaneously, the resilient lip is biased by the clapper under the influence of increased pressure into flatly abutting contact with the flat seating surfaces.

A major object of this invention is to provide a swing check valve having a valve seating surface of tapered or frusto-conical configuration and further having a valve closure member carrying tapered or frusto-conically shaped sealing surfaces complementary in configuration to said seating surfaces.

Another object of the present invention is to provide a swing check valve in which a pivotally mounted closure member is adapted to move both in alignment with and normal to the axis of fluid flow and to the valve seat.

An additional object of this invention is to provide a valve closure member incorporating an improved seal structure to provide effective fluid flow shutoff under conditions of high or low fluid pressures and in fluids having a high solids content.

A further object of this invention is to provide in a swing check valve means to prevent low pressure backflow past the valve closure member at the initial instant of closure, whereby the erosion or scoring of the seating and sealing surfaces of said valve is reduced or eliminated.

Another object of this invention is to provide a swing check valve having a durable sealing structure to make positive sealing engagement with the valve seat as the pressure on the valve closure member rises above the relatively low pressure biasing the closure member into initial contact with the valve seat.

A further object of the present invention is to provide a swing check valve closure member characterized by two resilient and one metal sealing surfaces which act independently of each other to establish sealing contact with the valve seat at different times during the period when the valve closure member is being biased to the fully closed position by less than maximum line pressure, and which act conjunctively to establish effective triple sealing contact with the valve seat at substantially maximum line pressure.

Another object of this invention is to provide a swing check valve having generally V-shaped resilient sealing means adapted to cushion the impact upon closure of the valve closure member by undergoing resilient deformation while simultaneously further hydraulically cushioning said impact by trapping fluid between the two lips of the V-shaped sealing means and the surface of the valve seat and then releasing said fluid through a small opening in response to the increase of pressure against the valve closure member.

A still further object of this invention is to provide a novel means for pivotally mounting a closure member in a swing check valve, which means converts the angular pivoting movement of the closure member to linear motion near to, and at the time of, closure contact so that tapered or frusto-conical seating and sealing surfaces may be employed in said swing check valve.

Another object of the present invention is to provide a swing check valve which is characterized by simplicity of construction, economy of manufacture, and long operational life.

These objects and advantages of the present invention will be better understood, and others will become evident from the following detailed description, when read in conjunction with the accompanying drawings in which.

Figure 1:
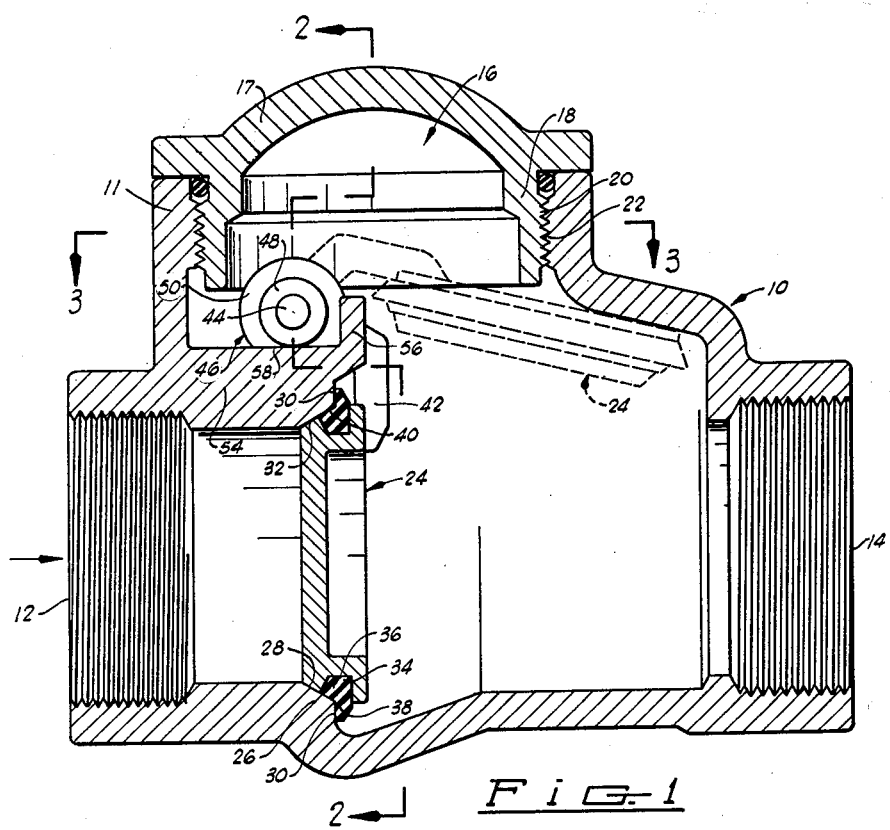
FIGURE 1 is a vertical sectional view taken along the longitudinal center line of a swing check valve constructed in accordance with the present invention, and illustrating in dashed lines the position of the valve closure member in the opened position.

Referring now to the drawings in detail, FIG. 1 illustrates in section a complete novel swing check valve of the present invention. The valve body generally is indicated by reference numeral 10. The valve has the usual inlet and outlet ports, 12 and 14 respectively, and is further characterized by an access port designated generally by reference numeral 16. An access port cover portion 17 has formed integrally therewith a depending flange 18 which carries external threads 20 to permit threaded engagement with the threaded internal walls 22 of the access port. Disposed within the valve body is a pivotally mounted closure member or clapper which is generally designated by reference numeral 24. The clapper 24 is disposed adjacent to and makes sealing contact with a seat 26 having a tapered or frusto-conical seating surface 28 and a plane or flat seating surface 30 disposed contiguously to said tapered seating surface 28.

Figure 4:
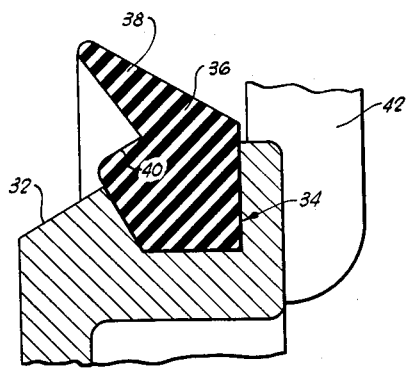
FIGURE 4 is an enlarged detail view of the metal and resilient sealing surfaces carried by the pivotally mounted valve closure member of the present invention.
Figure 5:
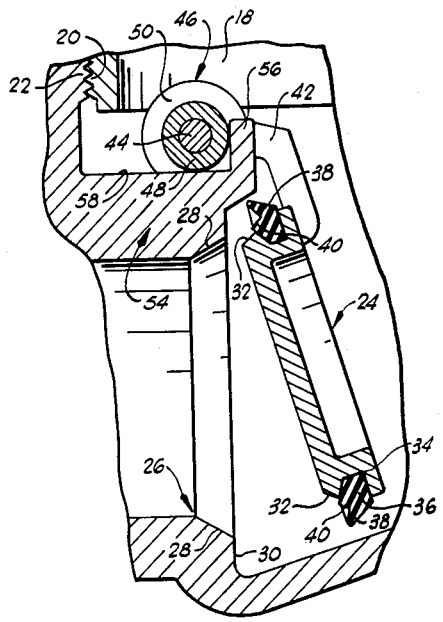
FIGURES 5, 6, 7 and 8 are sectional views in detail showing, when considered conjunctively, the sequential sealing action of the sealing surfaces carried by the valve closure member upon closure of the valve.

The clapper 24 is a circular-shaped member and has a tapered or generally frusto-conically shaped metallic sealing surface 32. Around the periphery of the frusto-conical sealing surface 32 is disposed a circumferential groove 34 in which an annular resilient sealing member 36 is retained. The relative arrangement of the frusto-conical metal sealing surface 32, its circumferential groove 34 and the resilient sealing member 36 retained therein may best be understood by reference to FIG. 4.

The resilient sealing member 36 is characterized by a generally triangular-shaped lip 38 which projects outwardly from the tapered or frusto-conical metallic sealing surface 32 and substantially normal thereto. An additional sealing surface 40 is provided by the resilient sealing member 36 in a plane extending substantially normal to the lip 38 and substantially parallel to the frusto-conical sealing surface 32. The sealing surface 40 is staggered, or offset outwardly, from the frusto-conical sealing surface 32. Stated differently, the sealing member 36 is of such configuration that the projecting lip portion 38 and the sealing surface 40 define substantially a right angle and, as will be later explained, provide two resilient sealing surfaces which make sealing contact with the frusto-conical and flat surfaces, 28 and 30, respectively, of the valve seat 26 during closure of the valve.

Figure 2:
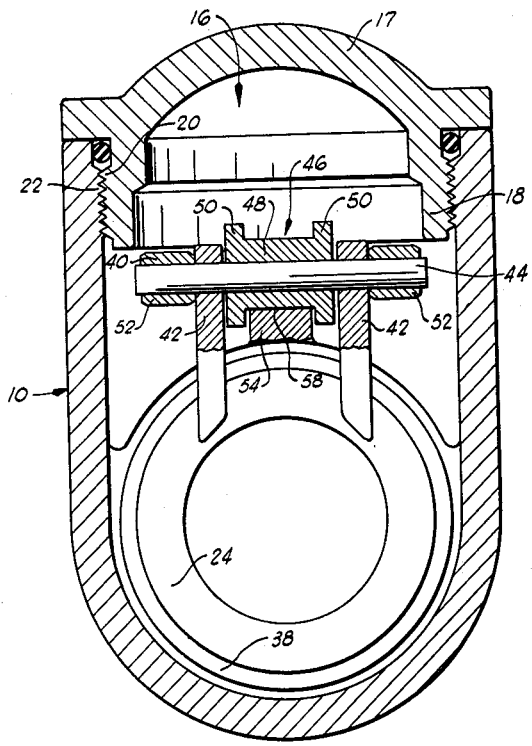
FIGURE 2 is a transverse sectional view of the valve taken along lines 2—2 of FIG. 1.

As shown in FIGS. 1 and 2, the closure member 24 is supported by a pair of vertically extending arms 42 attached at their lower ends to the closure member 24 and journaled at their upper ends on a hinge pin 44 which extends transversely in the valve body. It will also be noted that the arms 42 are bent or angled over the valve seat 26 in upwardly spaced relation from the closure member 24. Centrally located on the hinge pin 44 and disposed between the points of connection of the angled arms 42 is a spool-shaped bushing designated generally by reference numeral 46. The spool-shaped bushing 46 and the angled arms 42 may in each case be either fixedly or rotatably journaled on the hinge pin 44, provided that if the spool-shaped bushing 46 is fixedly mounted on the hinge pin, then it is desirable to the operation of the valve that the angled arms 42 be rotatably journaled thereon. The spool-shaped bushing 46 comprises a tubular body portion 48 having circumferential flanges 50 on the opposite ends thereof.

Mounted on each end of the hinge pin 44 are a pair of end bushings 52 which serve to retain the hinge pin in its position relative to the angled arms 42 of the closure member 24 and the spool-shaped bushing 46. By reference to FIGS. 2 and 3, it will be perceived that the flange portion 18 of the cover 17 terminates closely adjacent the end bushings 52, but in spaced apart relation thereto, to limit upward movement of the pin 44, as will be described.

Figure 3:
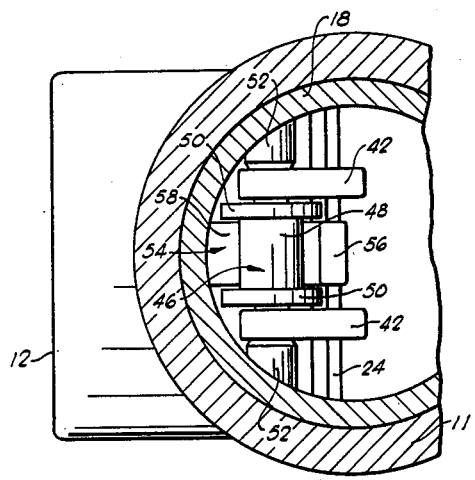
FIGURE 3 is a horizontal sectional view taken along lines 3—3 of FIG. 1.

As shown in FIGS. 1 and 3, a projection 54 extends inwardly into the valve body 10 from the internal wall thereof in a direction substantially parallel to the axis of fluid flow. At its end opposite the end which is connected to the internal wall of the valve, the projection 54 terminates in a hook-shaped end portion 56. The upper surface 58 of the projection 54 intermediate its ends is flat and forms a track along which the spool-shaped bushing 46 may roll or slide, as will be hereinafter further explained. Because of its function as a tracking surface for supporting the bushing 46, this portion 58 of the projection 54 will hereinafter be termed the track portion.

FIG. 2 more clearly illustrates the manner in which the spool-shaped bushing 46 is mounted for rolling movement along the track portion 58. It will be observed that the transverse dimension of the track portion 58 is substantially equal to the length of the centrally located tubular body portion 48 of the bushing 46 so that the end flanges 50 of the spool-shaped bushing track along the sides of the track portion 58 and prevent transverse displacement of the bushing relative to the projection 54. It will be apparent to those skilled in the art, however, that the bushing 46 may merely slide along the track 58 under some operating conditions.

FIGS. 5, 6, 7 and 8 are views illustrating the sealing effect accomplished during closure of the valve and since the elements there depicted have been numerically identified in the detailed description of the preceding figures, an explanation of the operating principles illustrated in FIGS. 5, 6, 7 and 8 will be presented in the following description of the operation of the novel swing check valve of the present invention.

*Operation*

The desirable feature of ordinary swing check valves which resides in the provision of a full opening closure member to permit unobstructed fluid flow through the valve is well known in the prior art and is characteristic of the present invention. Thus, as illustrated in FIG. 1, the pivoted closure member 24 is pivoted upon opening of the valve to a position well removed from the axis of flow of the fluid through the valve. The fully opened position of the closure member 24 is illustrated in dashed lines in FIG. 1. The closure member 24 and its connected angled arms 42 may pivot freely about the hinge pin 44 or, as previously described, may be fixedly secured to the hinge pin and rotate therewith.

When the flow of fluid through the valve tends to reverse and the back pressure begins to rise, the closure member 24 commences to fall downwardly under the combined influences of gravity and reduced pressure on its sealing face. As it moves downwardly it also becomes subject to the biasing influence of fluid pressure upon its non-sealing or rear face. Thus far in its closure movement, the pivotally mounted closure member 24 is identical in its operation to the types previously used in swing check valves and well known in the art.

Referring now to FIGS. 5, 6, 7 and 8, the novel sealing action of the valve of this invention will be explained in detail. As the closure member 24 nears the end of its downward movement or, stated differently, as the closure member approaches the position at which it contacts the seat 26 of the valve, the spool-shaped bushing 46 commences to roll along the track portion 58 of projection 54 in a direction away from the hook-shaped end portion 56. This rolling motion of the spool-shaped bushing 46 may be said to commence at approximately the instant at which the lip 38 of the resilient member 36 contacts the flat seating surface 30 of the seat 26. With the commencement of this linear rolling motion of the spool-shaped bushing 46 along the track portion 58, the pivotal or angular motion of the closure member 24 is converted to linear motion along the axis of fluid flow. The movement of the closure member 24 and its associated sealing surfaces then becomes substantially identical to the movement encountered in reciprocating, poppet or ball check valves characterized by tapered or frusto-conical seating surfaces. The fixed pivotal axis afforded by the hinge pin 44 is in effect existent only during the interval that the clapper is making the swing from a fully opened position to a position closely adjacent the valve seat 26; in which latter position the lip 38 of the resilient member 36 contacts the flat seating surface 30 of the valve seat 26.

After the pivotal motion of the closure member 24 has been converted to linear motion, the closure member and its associated sealing surfaces move along a line which is parallel to the axis of fluid flow through the valve with the closure member substantially in coaxial registry with the annular seat 26. The first portion of the closure member 24 and its associated sealing surfaces to contact the valve seat 26 is the protruding resilient lip 38 which makes sealing contact with the flat seating surface 30 of the seat 26.

Since the closure member 24 is free to move linearly along the axis of fluid flow as well as pivotally, it will automatically align itself in a plane which is substantially parallel to the plane of the flat seating surface 30 with which the lip 38 initially comes in contact. Thus, if the resilient lip 38 should not contact the flat seating surface 30 squarely upon closure of the valve, this condition is immediately corrected by movement of the spool-shaped bushing 46 along the track 58 to bring the closure member 24 and the attached resilient lip 38 into flush or parallel alignment with the flat seating surface 30. The flat seating surface 30 then makes sealing engagement with the lip 38 throughout its peripheral extent and the initial sealing action of the valve closure member 24 is accomplished. Since this initial seal is essentially a flat surface type seal, it is not critical at this point in the valve closure that there obtain exact concentric alignment of the lip 38 with the annular seat 26 and its associated flat seating surface 30. In this respect, this initial seal is characterized by one of the advantages of ordinary swing check valves which have previously been discussed.

It will be appreciated that the rather long narrow shape of resilient lip 38 enables it to function as a spring tending to cushion the impact of the valve closure member 24 as it strikes the valve seat 26. Moreover, of course, compression of the resilient lip 38 also serves to cushion this impact.

Figure 7:
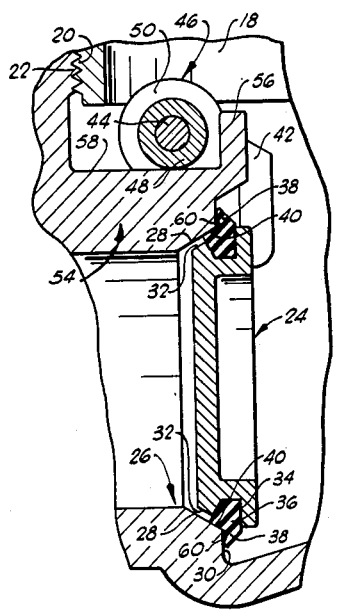

As momentum and fluid pressure force the closure member 24 and its associated sealing surfaces into tighter sealing engagement with the exposed surfaces of the valve seat 26, the condition illustrated in FIG. 7 obtains. In referring to this figure, it will be seen that the resilient lip 38 has commenced to be bent outwardly from its position of repose and is commencing to conform to the flat seating surface 30. The tapered or frusto-conical sealing surface 40 of the annular resilient member 36 has moved into contact with the frusto-conically shaped seating surface 28 and has established sealing contact therewith.

It will be recalled that in the previous discussion of the sealing motion of valves having frusto-conical or tapered seats, such as, for example, poppet valves, ball check valves, etc., it was stated that not only is it necessary for the closure member of such valves to move linearly and parallel to the axis of fluid flow, but that it is also essential that the closure member be precisely centered, or, stated differently, that the closure member be in exact coaxial alignment with the valve seat at the time of seating. The manner in which the necessary linear movement is imparted to the closure member 24 of the present valve has been previously described, and a discussion of the way in which the closure member and its associated sealing surfaces is brought into concentric or coaxial alignment with the valve seat 26 now follows.

As was indicated in the description of FIGS. 2 and 3, the annular flange 18 of the cover portion 17 terminates at a position in the valve body 10 closely adjacent the end bushings 52 and yet slightly spaced therefrom. The flange 18 thus functions to retain the hinge pin 44 and its associated bushings against unlimited movement in a direction normal to the track portion 58 of the projection 54, but by virtue of its spatial arrangement with respect to the end bushings 52, will allow some displacement of the spool-shaped bushing 46 away from the track portion. Since the spool-shaped bushing 46, hinge pin 44 and the angled arms 42 attached thereto can move in a direction normal to the flat-surfaced track portion 58, the closure member 24 also can shift in a direction normal to the axis of the valve seat 26 and thus may be coaxially aligned with respect thereto. The resistive force offered by the first part of the frusto-conical seating surface 28 encountered by the tapered or frusto-conical sealing surface 40 of the resilient member 36 will serve to force the closure member 24 and its associated sealing surfaces into a coaxial relationship to the annular seat 26. In this manner a positive seal will be established throughout the entire peripheral extent of the frusto-conical sealing surface 40 and its complementary seating surface 28.

Figure 8:
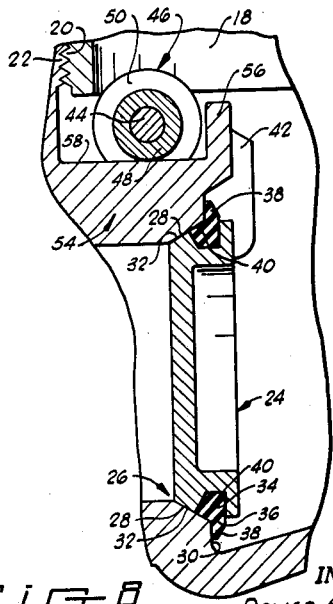

The particular relative arrangement of the resilient lip 38 with respect to the resilient frusto-conical sealing surface 40 permits further cushioning action to occur at the period during closure which is represented by the situation depicted in FIG. 7. It will be obvious, of course, that since the resilient sealing surface 40 is offset from the metallic sealing surface 32, further cushioning of the closure impact is afforded by the further compression of resilient member 36 which occurs when the sealing surface 40 contacts seating surface 28. In addition to this cushioning effect, however, the entrapment and release of fluid from a pocket or groove 60 formed between lip 38, resilient sealing surface 40 and flat seating surface 30 results in the occurrence of hydraulic cushioning. When the closure member 24 and its associated sealing surfaces reach the position shown in FIG. 7, some of the fluid passing through the valve is entrapped in the groove 60. As the closure member 24 continues to move into its final sealing position as shown in FIG. 8, the trapped fluid is forced out of the groove 60 through relatively small openings between the sealing surface 40 and the seating surface 28 and also between the lip 38 and the flat sealing surface 30. Since the lip 38 is relatively flexible and is subjected to less sealing compression than is the resilient frusto-conical sealing surface 40, most of the fluid will be squeezed out through the opening created between lip 38 and flat seating surface 30, and conversely, very little leakage of this entrapped fluid to the low pressure side of the valve will result.

Figure 6:
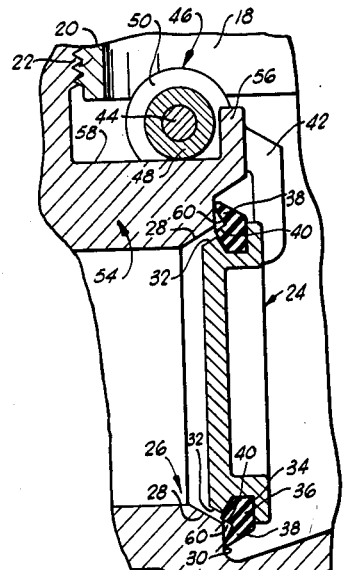

As the pressure against the closure member 24 continues to build up, the closure member and its associated sealing surfaces will attain their final sealing position as shown in FIG. 8. It will be noted that the resilient frusto-conical sealing surface 40 has been subjected to further compression and that the metallic frusto-conical sealing surface 32, which is adjacent to, but offset from, the resilient frusto-conical sealing surface 40, has made sealing contact with the metallic tapered seating surface 28 of annular seat 26. Of course, as the clapper moves into its final sealing position along the axis of fluid flow, the spool-shaped bushing 46 rolls along track portion 58 of projection 54 to a position further removed from the hook-shaped end portion 56 of the projection 54 than that which it occupies upon initial contact of lip 38 with seating surface 30 as depicted in FIG. 6. In the final closure position of the closure member 24 as illustrated in FIG. 8, it may properly be said that triple sealing engagement of the sealing surfaces with the valve seat is achieved. Thus, a metal-to-metal seal between tapered or frusto-conically shaped sealing surfaces is obtained between sealing surface 40 and seating surface 28; a resilient material-to-metal seal between frusto-conically shaped sealing surfaces is obtained between sealing surface 40 and seating surface 28; and lastly, a flat surface seal between a resilient material and metal is established between resilient lip 38 and flat seating surface 30.

From the foregoing detailed description of the relative arrangement of the various components of the novel swing check valve of the present invention, and the discussion of the manner of operation of said valve, it will be apparent that many of the previously existing disadvantages associated with such valves have been successfully overcome, and further, that the highly effective sealing characteristics of other check valve types having tapered or frusto-conical seats have been incorporated in the swing check valves of this invention.

Changes may be made in the combination and arrangement of parts or elements of the novel swing check valve which I have described and which are depicted in the drawings, it being understood that changes may be made in the embodiment disclosed without departing from the spirit and scope of the invention as defined in the following claims. For example, although I have described a swing check valve having an annular seat and a mating valve closure member, my invention is intended to be applicable to swing check valves having seats and closure members of rectangular, elliptical or other configuration.

I claim:

1. A swing check valve comprising a valve body; a valve seat disposed in said valve body, said seat having tapered and flat seating surfaces disposed contiguously to each other; a valve closure member having a first and a resilient second tapered sealing surfaces each complementary in configuration to said tapered seating surface and offset from each other to successively contact said tapered seating surface, said valve closure member further having an additional resilient sealing surface disposed in a plane substantially normal to said first and second sealing surfaces and positioned to contact said flat seating surface before said tapered sealing surfaces contact said tapered seating surface; and means pivotally securing said valve closure member in said valve body while permitting said valve closure member to move substantially normal, and substantially parallel, to said flat seating surface during one increment of its closing movement.

2. A swing check valve comprising a valve body having an annular seat disposed therein, said seat having a frusto-conical shaped seating surface and a flat seating surface intersecting said frusto-conical seating surface at an obtuse angle; a pivoted clapper for making sealing engagement with said seating surfaces, said clapper comprising a metallic frusto-conical sealing surface for establishing sealing engagement with the frusto-conical seating surface of said seat, and a resilient member having two contiguous sealing surfaces for making sealing contact with said frusto-conical seating surface and said flat seating surface respectively, said resilient member sealing surfaces forming a smaller angle with each other than said obtuse angle whereby fluid may be entrapped in a pocket defined by said resilient member sealing surfaces and said seat upon closure of said valve; and means pivotally securing said clapper in said valve body while permitting said clapper to move parallel and normal with respect to said flat seating surface during one increment of its closing movement.

3. A swing check valve comprising a valve body; an annular seat disposed in said valve body, said seat having a frusto-conical seating surface and a flat seating surface; a pivoted clapper disposed adjacent said annular seat, said clapper having a metallic generally frusto-conical sealing surface adapted to make sealing engagement with said frusto-conical seating surface; a generally V-shaped resilient sealing member having two leg portions and disposed circumferentially about said frusto-conical sealing surface with a surface of one of the legs of said generally V-shaped member lying in a plane extending substantially parallel to and spaced apart from said frusto-conical seating surface and a surface of the other of said legs of said V-shaped member lying in a plane extending substantially normal to said frusto-conical seating surface; and means pivotally securing said clapper on said valve body while permitting said clapper to move parallel and normal with respect to said flat seating surface during one increment of its closing movement.

4. A swing check valve as claimed in claim 3 wherein said means for securing said clapper in said valve body comprises a projection extending from the internal wall of said body, said projection having a hook-shaped end portion and a track portion disposed intermediately of its length; a hollow spool-shaped bushing mounted on said track portion for movement therealong; hinge means extending through said hollow spool-shaped bushing; a pair of spaced apart arm members connected at one of their ends to said clapper and connected at the other of their ends to said hinge means, and means for limiting the movement of said hinge means and its associated bushing in a direction normal to said track portion while permitting said spool-shaped bushing to move along said track portion.

5. A swing check valve comprising a valve body having an axial bore extending therethrough; an access port in said body and extending substantially normal to said bore; a cover for said access port; an annular threaded flange integral with and depending from said cover for threaded engagement with the internal walls of said access port; a second annular flange within said valve body providing a seating portion for said valve, said second annular flange being characterized by a flat face disposed in a plane extending substantially normal to said axial bore and by a frusto-conical face contiguous to said flat face; a pivotal clapper for seating against said second annular flange when said valve is closed, said clapper having three sealing surfaces for making consecutive sealing contact with the faces of said annular flange as said valve is closed; a pair of angled arm members each connected at one of its ends to said clapper and each defining at the other of its ends a circular aperture; a hollow spool-shaped bushing disposed between said arm members with the openings at each end of said spool-shaped bushing in registry with the apertures defined by said arm members; a hinge pin extending through the apertures defined by said arm members and through said spool-shaped bushing, said spool-shaped bushing being rotatably mounted on said hinge pin; a pair of terminal bushings mounted on said hinge pin adjacent each of its ends; a projection integral with the internal wall of said access port and extending from said wall parallel to said axial bore, said projection having a hook-shaped portion at its end opposite its point of connection to said internal wall, and further having a track portion intermediate its length, said spool-shaped bushing being mounted on said track portion for rolling movement therealong in a direction parallel to said axial bore whereby said pivotal clapper and its associated sealing surfaces may seat against said second annular flange and its associated faces in a direction substantially normal to the flat face of said second annular flange.

6. In a full opening swing check valve, the improvement which comprises an annular seat having frusto-conical and flat seating surfaces disposed in contiguous relation to each other; a valve closure member pivotally supported in the valve comprising an annular metallic portion having a frusto-conical shaped sealing surface complementary in configuration to said frusto-conical seating surface, said metallic portion having a circumferential groove in said frusto-conical shaped sealing surface around the periphery of said metallic portion; and an annular resilient sealing member retained in said groove, said resilient sealing member having a lip extending outwardly from, and substantially normal to, said frusto-conical shaped sealing surface, and said resilient sealing member further having a surface extending normal to said lip and substantially parallel to and concentric with said frusto-conical shaped sealing surface whereby said resilient sealing member and said frusto-conical shaped sealing surface make consecutive contact with said annular seat during closure of the valve and provide triple sealing contact with said annular seat when the valve is closed.

7. In a check valve, the improvement which comprises an annular seat having frusto-conical and flat seating surfaces; pivotally mounted valve closure means having a generally frusto-conical sealing surface and disposed adjacent said seat, said valve closure means having an annular groove in said frusto-conical sealing surface; and a resilient sealing member retained in said groove, said resilient sealing member having a tapered lip projecting normal to said frusto-conical sealing surface for resiliently engaging said flat seating surface upon closure of said check valve, and further having a sealing surface extending substantially parallel to said frusto-conical sealing surface whereby said valve closure means and its associated resilient sealing member provide triple sealing contact with said seat when said valve is closed.

8. A check valve as claimed in claim 7 wherein said frusto-conical and flat seating surfaces are contiguous and subtend an obtuse angle; and said tapered lip initially contacts said flat seating surface at an acute angle upon closure of said valve closure means whereby fluid is entrapped during closure of said valve in a pocket defined by said resilient member and said flat seating surface to allow pressure equalization on opposite sides of said tapered lip.

References Cited in the file of this patent

UNITED STATES PATENTS

| 991,784 | Kiley | May 9, 1911 |
| 2,093,662 | Steirly | Sept. 21, 1937 |

FOREIGN PATENTS

| 17,947 | Great Britain | Sept. 5, 1889 |
| 144,934 | Australia | Nov. 30, 1950 |
| 372,157 | France | Mar. 27, 1907 |
| 538,629 | Italy | Jan. 28, 1956 |
| 618,299 | France | Mar. 7, 1927 |